(12) United States Patent
Nakamura et al.

(10) Patent No.: US 7,759,830 B2
(45) Date of Patent: Jul. 20, 2010

(54) ALTERNATING CURRENT GENERATOR WITH IMPROVED FRAME STRUCTURE

(75) Inventors: Shigenobu Nakamura, Anjo (JP); Yoshiki Tan, Anjo (JP); Masatoshi Koumura, Okazaki (JP); Akihito Koike, Kariya (JP)

(73) Assignee: Denso Corporation, Kariya (JP)

( * ) Notice: Subject to any disclaimer, the term of this patent is extended or adjusted under 35 U.S.C. 154(b) by 341 days.

(21) Appl. No.: 11/896,872

(22) Filed: Sep. 6, 2007

(65) Prior Publication Data

US 2008/0061659 A1 Mar. 13, 2008

(30) Foreign Application Priority Data

Sep. 12, 2006 (JP) .............................. 2006-246947

(51) Int. Cl.
  H02K 9/28 (2006.01)
(52) U.S. Cl. ...................................... 310/68 D; 310/89
(58) Field of Classification Search ............... 310/68 D, 310/71, 208, 89
   See application file for complete search history.

(56) References Cited

U.S. PATENT DOCUMENTS

| | | | |
|---|---|---|---|
| 4,705,983 A * | 11/1987 | Franz et al. ................ | 310/68 D |
| 5,686,773 A | 11/1997 | Sakakibara et al. | |
| 6,144,136 A * | 11/2000 | Umeda et al. ................ | 310/201 |
| 6,198,188 B1 * | 3/2001 | Ihata ........................ | 310/68 D |
| 6,201,332 B1 | 3/2001 | Umeda et al. | |
| 6,249,956 B1 | 6/2001 | Maeda et al. | |
| 6,333,573 B1 | 12/2001 | Nakamura | |
| 6,404,091 B1 | 6/2002 | Nakamura et al. | |
| 6,885,123 B2 | 4/2005 | Gorohata et al. | |
| 7,067,947 B2 | 6/2006 | Ihata et al. | |

| | | |
|---|---|---|
| 2003/0163912 A1 | 9/2003 | Tokizawa et al. |
| 2004/0201294 A1 | 10/2004 | Kurahashi |
| 2006/0192446 A1 | 8/2006 | Ihata et al. |

FOREIGN PATENT DOCUMENTS

| | | |
|---|---|---|
| JP | A-S50-080413 | 6/1975 |
| JP | A-S58-165649 | 9/1983 |

(Continued)

OTHER PUBLICATIONS

Notification of Reasons for Rejection for corresponding Japanese Patent Application No. 2006-246947.

(Continued)

*Primary Examiner*—Dang D Le
(74) *Attorney, Agent, or Firm*—Oliff & Berridge, PLC

(57) ABSTRACT

In an alternating-current generator, an end wall of a frame is provided with a plurality of fin supports separately arranged on the outer surface of the end wall. The cooling fin is mounted on the plurality of fin supports. The end wall is provided with a plurality of reinforcements each arranged between a corresponding one of the plurality of fin supports and another one thereof and each configured to reinforce a rigidity of a portion of the end wall. The corresponding one of the plurality of fin supports and another one thereof are adjacent to each other in a circumferential direction of the axis of the rotor. The rigidity-reinforced portion of the end wall is located between the corresponding one of the plurality of fin supports and another one thereof.

10 Claims, 11 Drawing Sheets

FOREIGN PATENT DOCUMENTS

| | | |
|---|---|---|
| JP | A-2-46143 | 2/1990 |
| JP | A-3-183337 | 8/1991 |
| JP | A-2000-253625 | 9/2000 |
| JP | A-2003-324885 | 11/2003 |
| JP | B2-3508687 | 1/2004 |
| JP | A-2004-147486 | 5/2004 |
| JP | A-2004-312884 | 11/2004 |
| WO | WO 2006/004246 A1 | 1/2006 |

OTHER PUBLICATIONS

Foreign language Office Action issued in Japanese Patent Application No. 2006-246947 on Mar. 23, 2010.

German Office Action issued Mar. 23, 2010 in German Application No. 10 2007 043 125.4-32.

* cited by examiner

① (INNERMOST LAYER)   ③ (OUTER MIDDLE LAYER)

② (INNER MIDDLE LAYER)   ④ (OUTERMOST LAYER)

ALTERNATING CURRENT GENERATOR WITH IMPROVED FRAME STRUCTURE

CROSS REFERENCE TO RELATED APPLICATIONS

This application is based on Japanese Patent Application 2006-246947 filed on Sep. 12, 2006. This application claims the benefit of priority from the Japanese Patent Application, so that the descriptions of which are all incorporated herein by reference.

FIELD OF THE INVENTION

The present invention relates to alternating-current (AC) generators installable in, for example, vehicles; these rotary electric machines are each made up of an improved frame structure.

BACKGROUND OF THE INVENTION

Conventional AC generators for vehicles are each equipped with a frame one end of which has an end wall and with a rectifier. The rectifier is composed of a substantially U-shaped cooling fin extending in parallel to the surface direction of the end wall and of a plurality of diodes for a number of, for example, three phase windings of a stator; these plurality of diodes are separately mounted on the cooling fin.

An example of a frame of such an AC generator is disclosed in U.S. Pat. No. 6,198,188 B1, which was filed by the same applicant as the present invention, corresponding to Japanese Unexamined Patent Publication No. 2000-253625.

Referring to FIG. 11, one end wall 101 of a frame 100 of an AC generator continues from an annular side wall thereof, and a tubular boss 105 having a cylindrical side wall extends from the periphery of a hole H thereof in an axial direction of a rotary shaft rotatably supported in the hole H.

Four spokes 106 are radially arranged at intervals and configured to join the tubular boss 105 to the outer ring portion 104.

Four fin supports 103 are formed on the outer ring portion 104 of the end wall 101 of the frame 100. A female screw hole 102 is so formed through each of the fin supports 103 as to align with a corresponding one of through holes (not shown). The through holes are formed through an outer periphery of a negative cooling fin.

Specifically, four screw bolts (not shown) are inserted in the respective through holes of the negative cooling fin to extend therefrom. The extending portions of the screw bolts are inserted in the corresponding female screw holes 102 to, be engaged therewith, respectively. This allows the negative cooling fin of the rectifier to be fastened to the frame 100.

The four fin supports 103 are configured to have a predetermined radially and circumferentially extending surface and axially project toward the negative cooling fin.

Four intake windows 107 are formed between the circumferentially adjacent four spokes 106, respectively. Four through holes 108 are formed through the outer ring portion 104 and arranged radially outwardly adjacent to the radial outer edges of the four spokes 106, respectively.

A plurality of negative diodes are fitted in respective fitting holes of the negative cooling fin. Diode leads, such as negative main terminals, extending from the respective negative diodes in an axial direction of the rotary shaft are joined to AC (Alternative Current) terminals of terminal blocks; these AC terminals are joined to stator leads extending from the three-phase windings of a stator of the AC generator.

On the other hand, in order to reduce the resistance of one or more phase windings, such as three-phase windings, constituting a stator coil of an AC generator, a stator coil with a specific structure is illustrated in U.S. Pat. No. 6,333,573 B1, which was filed by the same applicant as the present invention, corresponding to Japanese Patent Publication No. 3508687.

In the structure of the stator coil, each of three-phase stator windings is made up of a plurality of conductor segments each having a substantially rectangular shape in its lateral cross section. The plurality of conductor segments are inserted in slots of a stator.

One end of each of the conductor segments projecting one of the slots is sequentially welded to the other end of a corresponding one of the conductor segments projecting a corresponding another one of the slots so that the sequentially joined conductor segments provide radially layered annular windings. The configuration of each of the multiphase windings allows low resistance of the three-phase stator windings, thus improving a power output of the AC generator.

SUMMARY OF THE INVENTION

As an example of an AC generator having a rectifier mounted on its frame, an engine-driven alternator may vibrate with grate amplitudes in a direction orthogonal to an axial direction of a rotary shaft linked to a crankshaft of an engine depending on, for example, the variation in rotation of the crankshaft. The vibration may have an adverse affect on the rectifier mounted on the frame of the engine-driven alternator.

The problem due to the vibration will be described hereinafter when a cooling fin provided with a plurality of diodes and mounted on one end wall surface of a frame at a plurality of separated portions thereof is taken as an example.

The radial vibration is transferred to the cooling fin through the separated portions of the one end wall surface of the frame, which may cause elastic deformation in the frame. The elastic deformation in the frame may create distortion in the cooling fin because the respective amounts of deformation of the separated portions of the one end wall surface may be different from each other. This may cause adverse stress to occur in, for example, each of the diodes mounted on the cooling fin.

In addition, leads of the diodes separately fixed to the cooling fin are normally joined to AC terminals of terminal blocks fixed to the end wall of the frame of an AC generator together with the cooling fin. In the normal structure of the AC generator's frame, the distortion created in the cooling fin due to its vibration may cause radially relative displacement between the leads of the diodes and the corresponding AC terminals of the terminal blocks joined thereto to periodically occur. This may create vibrating stress in the joint portions between each of the diode leads and a corresponding one of the AC terminals.

On the other hand, increase in electrical power required to various vehicle electrical loads has raised the requirements for AC generators for vehicles, such as engine-driven alternators, to have a high power output without their sizes and weights being kept small. In order to increase the output power of an AC generator with its size and weight being kept small, it is important to effectively cool electrical components installed in the AC generator, such as diodes and stator coil.

An object of at least one aspect of the present invention is therefore to provide AC generators, each of which is designed to enable distortion of a cooling fin mounted on a frame thereof to be reduced.

Another object of at least one aspect of the present invention is therefore provide AC generators, each of which is designed to enable the cooling capability thereof to increase.

According to one aspect of the present invention, there is provided an alternating-current (AC) generator for rotating, about an axis, a magnetized rotor relative to a stator to generate AC power. The AC generator includes a rectifier. The rectifier includes at least one rectifying element working to rectify the generated AC power to direct-current (DC) power, and a cooling fin on which the at least one rectifying element is mounted. The AC generator includes a frame having an end wall and surrounding the rotor and the stator such that the rotor is rotatable about the axis relative to the stator. The end wall has an inner surface and an outer surface opposing thereto, the inner surface of the end wall facing the rotor and the stator. The end wall is provided with a plurality of fin supports separately arranged on the outer surface of the end wall. The cooling fin is mounted on the plurality of fin supports. The end wall is provided with a plurality of reinforcements each arranged between a corresponding one of the plurality of fin supports and another one thereof and each configured to reinforce a rigidity of a portion of the end wall. The corresponding one of the plurality of fin supports and another one thereof are adjacent to each other in a circumferential direction of the axis of the rotor. The rigidity reinforced portion of the end wall is located between the corresponding one of the plurality of fin supports and another one thereof.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the accompanying drawings.

Figure 1:
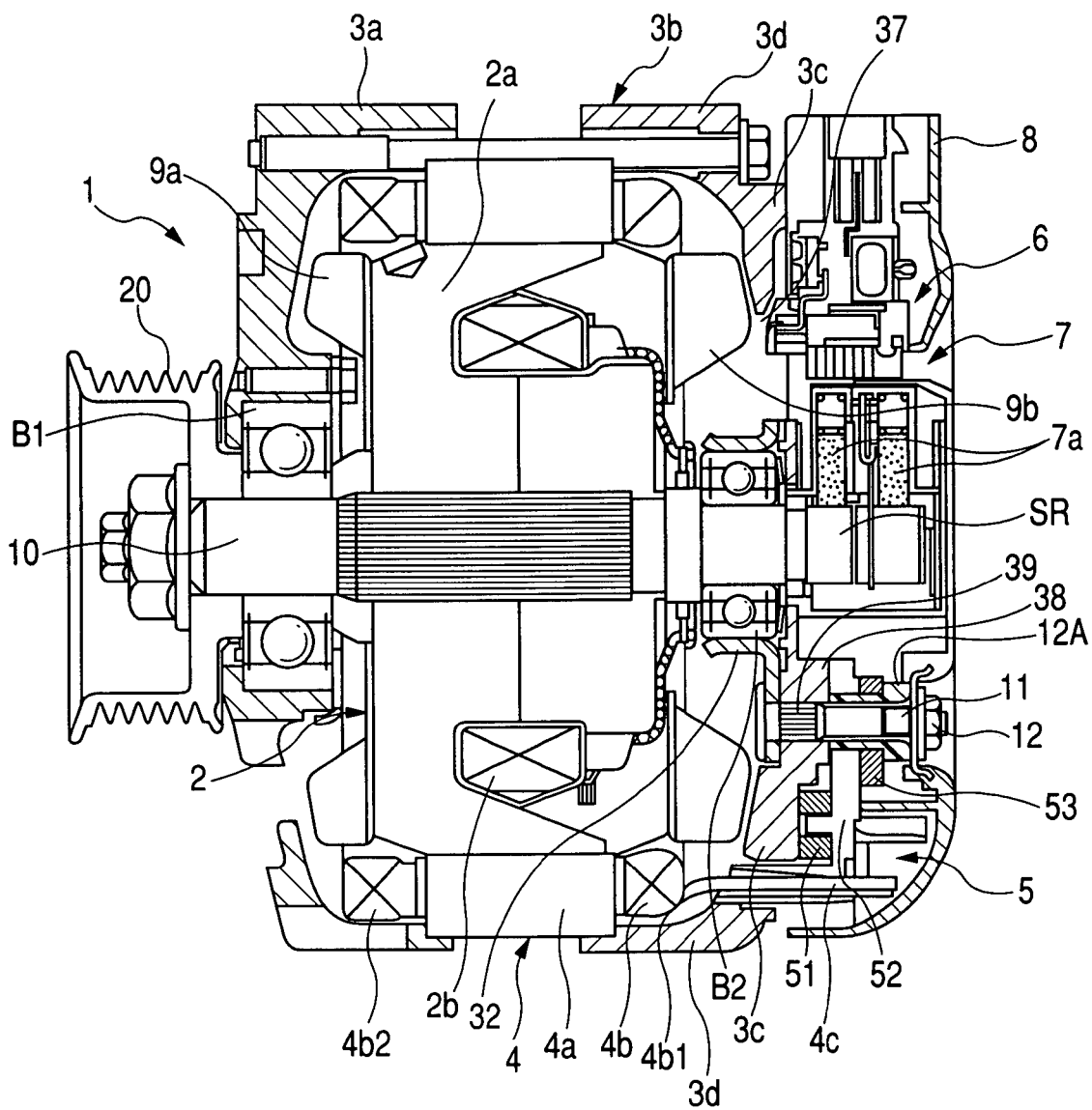
FIG. 1 is a partially axial sectional view illustrating an alternator according to an embodiment of the present invention.

Referring to the drawings, in which like reference characters refer to like parts in several views, particularly to FIG. 1, there is illustrated an alternator 1 for vehicles, as an example of AC generators.

The alternator 1 installed in, for example, an engine compartment of a vehicle includes a rotor 2, a frame 3, a stator 4, a rectifier 5, a voltage regulator 6, a brush assembly 7, slip rings SR, a rear end cover 8, a cooling fan 9a, a centrifugal cooling fan 9b, and so on.

The rotor 2 is disposed within the frame 3 to be attached to a rotary shaft 10. One end of the rotary shaft 10 is linked to a pulley 20 such that the rotary shaft 10 is rotatably driven through the pulley 20 by an engine (not shown) installed in the engine compartment.

Specifically, the rotor 2 is composed of, for example, a Lundell type (claw pole) core 2a. The pole core 2a has a pair of opposing circular plates axially assembled to the rotary shaft 10 and a number of, for example, six claw portions extending from the outer peripheral side of each of the circular plates. The claw portions of one of the circular plates and those of the other thereof are alternatively arranged in the circumferential direction of the rotor 2.

The rotor 2 is also composed of a field coil 2b. The field coil 2b consists of an insulating-film-coated copper wire and is so mounted between the circular plates of the pole core 2a as to be concentrically wound around the rotary shaft 10 in the form of a cylinder. The slip rings SR and a pair of brushes 7a of the brush assembly 7 are configured to provide electrical connections between the field coil 2b and a power supply (battery).

The cooling fan 9a and the centrifugal cooling fan 9b are respectively mounted on the external end surfaces of the circular plates of the pole core 2a by, for example, welding. The alternator 1 is arranged in the engine compartment such that the one end of the rotary shaft 10 linked to the pulley 20 is directed to the front side of the vehicle.

The cooling fan 9a serves as an axial flow fan. Specifically, when being rotated with rotation of the pole core 2a, the cooling fan 9a works to inhale cooling air from the front side of the vehicle into the frame 3, deliver the inhaled cooling air in the axial direction of the rotary shaft 10 and in radial directions thereof, and exhaust the delivered cooling air from the frame 3.

When being rotated with the rotation of the pole core 2a, the centrifugal fan 9b works to inhale cooling air from the rear side of the vehicle into the frame 3, deliver the inhaled cooling air in the radial direction of the rotary shaft 10, and exhaust the delivered cooling air from the frame 3.

The stator 4 is composed of a stator core 4a fixed to an inner peripheral wall of the frame 3.

The stator core 4a has, for example, a substantially annular shape and first and second annular axial end surfaces. The stator core 4a also has, for example, a plurality of groove-like slots formed on an inner wall surface of the stator core 4a.

The slots are formed through the stator core 4a in its axial direction (length direction) and are circumferentially arranged at given intervals.

The stator 4 is also composed of a stator coil 4b consisting of, for example, three-phase (U-, V-, and W-phase) windings connected in star or delta configuration as an example of single-phase or multi-phase windings. For example, each of the U-, V-, and W-phase windings has one and the other ends, the one ends of the U-, V-, and W-phase windings are electrically connected to each other in delta configuration, the connecting point serving as a neutral point. The other ends of the U-, V-, and W-phase windings serve as phase output terminals, respectively.

Each of the three-phase windings are inserted in the corresponding slots of the stator core 4a so that each of the three-phase windings is concentrically and cylindrically wound therearound to provide the stator coil 4b.

The stator coil 4b has first and second coil end portions 4b1 and 4b2 axially opposing each other. The first and second coil end portions 4b1 and 4b2 project from the first and second axial end surfaces of the stator core 4a toward the front and rear sides of the vehicle, respectively. For example, the phase output terminals of the three-phase windings of the stator coil 4b are drawn out from, for example, one of the second coil end portion 4b2 of the stator coil 4b (see FIG. 7).

As illustrated in FIG. 1, the stator 4 is arranged in the frame 3 such that the first coil end portion 4b1 faces the rear end cover 8 and the second coil end portion 4b2 faces the front side of the vehicle.

The frame 3 is configured to accommodate the rotor 2 and the stator 4 such that the stator core 4a is fixedly disposed around the outer periphery of the pole core 2a in which the inner periphery of the stator core 4a is opposite to the outer periphery of the pole core 2a with a predetermined air gap.

Specifically, the frame 3 is composed of a front frame 3a and a rear frame 3b located respectively at the front and rear sides in the axial direction of the rotary shaft 10. The front frame 3a and the rear frame 3b are fastened to each other by a plurality of fastening bolts. This fastening structure fixedly supports the stator 4 in the frame 3.

Each of the front and rear frames 3a and 3b has a substantially bowl-shaped structure.

Specifically, the front frame 3a has a substantially circular end wall with a hole at the center thereof in which one end portion of the rotary shaft 10 is rotatably supported in the hole by a bearing B1. The front frame 3a also has an annular side wall extending from the periphery of the circular end wall in parallel to the axial direction of the rotary shaft 10.

The rear frame 3b has a substantially circular end wall 3c with a hole H at the center thereof in which the other end portion of the rotary shaft 10 is rotatably supported in the hole H by a bearing B2 supported by the end wall 3c.

The rear frame 3b also has an annular side wall 3d extending from the periphery of an inner surface of the circular end wall 3c in parallel to the axial direction of the rotary shaft 10. An outer peripheral edges of the front and rear frames 3a and 3b are arranged opposing each other with a space therebetween.

The circular end wall of the front frame 3a is formed with a number of intake windows disposed opposing the cooling fan 9a so that cooling air can be inhaled into the frame 3 from the front side thereof.

Similarly, the circular end wall 3c of the rear frame 3b is formed with a number of, for example, four intake windows 37 therethrough. The four intake windows 37 are disposed opposing the centrifugal fan 9b so that cooling air can be inhaled into the frame 3 from the rear side thereof (see FIGS. 1 and 4).

The front frame 3a is also formed at its, for example, annular side wall with a plurality of discharge windows. The discharge windows are disposed opposing the front-side coil end so that the inhaled cooling air can be discharged therethrough out of the frame 3 (alternator 1).

Similarly, the rear frame 3b is also formed at its, for example, annular side wall with a plurality of discharge windows. The discharge windows are disposed opposing the rear side coil end so that the inhaled cooling air can be discharged therethrough out of the frame 3 (alternator 1).

The rear end cover 8 has a substantially bowled shape formed by, for example, molding from a resin material. The rear cover 8 is disposed to be putted over the rear frame 3b to protect the rectifier 5, the regulator 6, and the brush assembly 7.

The rectifier 5 is composed of a number of, for example, twelve diodes in full-bridge configuration, which will be described hereinafter.

The rectifier 5 is electrically connected to three stator leads 4c extending from the ends of the three-phase windings of the stator coil 4 drawn out from the front side coil end portion thereof.

The rectifier 5 is configured to convert a three-phase AC (Alternating Current) voltage applied from the three-phase windings of the stator coil 4b into a DC voltage using both positive and negative half cycles of the three-phase AC voltage. The DC voltage is configured to be output from the alternator 1 via the output terminal thereof as an output voltage.

Specifically, in the alternator 1 set forth above, a field current is applied to the field coil 2b through the slip rings SR and the brushes 7a while the field coil 2b of the rotor 2 is rotating based on torque applied from the engine through the pulley 20. In this situation, the field current flowing through the field coil 2b magnetizes the claw portions of one of the circular plates to the north (N) pole, and those of the other thereof to the south (S) pole.

The rotation of the alternately magnetized north and south poles create magnetic fluxes, and the created magnetic fluxes induce a three-phase AC voltage in the stator coil 4b. The induced three-phase AC voltage is full-wave rectified by the rectifier 5, thereby generating the DC voltage (output voltage). The voltage regulator 6 is configured to control the field current flowing through the field coil 2b depending on the alternator output voltage.

An example of the structure of the rectifier 5 will be described hereinafter.

Figure 2:
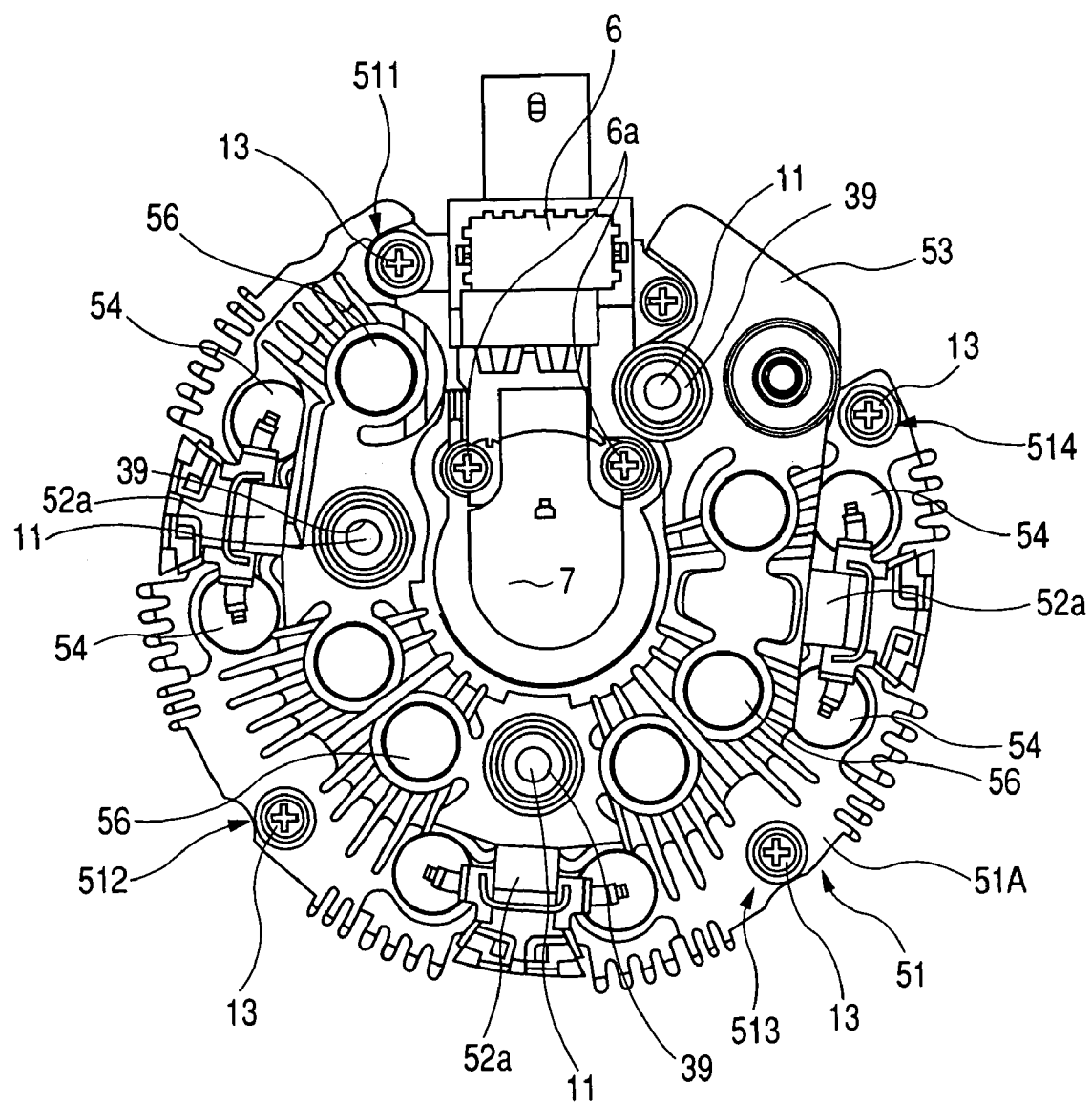
FIG. 2 is a plan view of the alternator illustrated in FIG. 1 when it is viewed from the rear side thereof with a rear end cover being removed according to the embodiment.

FIG. 2 schematically illustrates the alternator 1 when it is viewed from the rear side thereof with the rear end cover 8 being removed.

The rectifier 5 is composed of a metal cooling fin 51 with a substantially U-shape (horseshoe shape) serving as a negative electrode thereof, and a terminal block assembly 52 having a number of, for example, three terminal blocks 52a and having, for example, a circular arc shape. The terminal block assembly 52 is formed by, for example, molding a plastic material around preformed metal inserts serving as conductive members (AC terminals) for AC wiring for the rectifier 5. The rectifier 5 is also composed of a metal cooling fin 53 with a substantially U shape (horseshoe shape) serving as a positive electrode thereof.

The rectifier 5 is composed of a number of, for example, twelve diodes as an example of rectifying elements. Six diodes 54 of the twelve diodes respectively serve as negative diodes fixedly mounted on an external surface of the negative cooling fin 51 at intervals therebetween. The remaining six diodes 56 of the twelve diodes respectively serve as positive diodes fixedly mounted on an external surface of the positive cooling fin 53 at intervals therebetween.

For example, three of the six negative diodes 54 and three of the six positive diodes 56 are electrically connected to each other in full bridge configuration to provide a first three-phase full-wave rectifier bridge. Similarly, the remaining three negative diodes 54 and three positive diodes 56 are electrically connected to each other in full bridge configuration to provide a second three-phase full-wave rectifier bridge. Positive output terminals of the first and second rectifiers are electrically connected to each other, and negative terminals thereof are electrically connected to each other and to be grounded.

The connection between the first and second rectifier bridges allows the first and second rectifiers to serve as a parallel circuit. The conductive members are used to establish the three-phase AC wiring of each of the first and second three-phase full-wave rectifiers.

The negative cooling fin 51, the terminal block assembly 52, and the positive cooling fin 53 are fixedly mounted on an outer surface of the end wall 3c of the rear frame 3b by a number of, for example, three pairs of bolts 11 and nuts 12 such that:

the negative cooling fin 51, the terminal block assembly 52, and the positive cooling fin 53 are laminated in this order from the outer surface of the end wall 3c toward the rear end cover 8.

Specifically, the end wall 3c of the rear frame 3b is formed with a number of, for example, three fitting holes 39 therethrough in its axial direction. The three bolts 11 are inserted in the corresponding three fitting holes 39 from the inside of the rear frame 3b to be fitted therein and to extend from the end wall 3c.

An insulating sleeve 12A is configured to cover the extending portion of each of the three bolts 11 except for the tip end thereof. The negative cooling fin 51, the terminal block assembly 52, and the positive cooling fin 53 are respectively formed with three fitting holes aligned to each other corresponding to the three bolts 11. The negative cooling fin 51, the terminal block assembly 52, and the positive cooling fin 53 are mounted on in this order from the end wall 3c toward the rear end cover 8 such that:

the insulating sleeve 12A of each of the three bolts 11 is inserted to be fitted in the corresponding one of the three fitting holes of each of the negative cooling fin 51, the terminal block assembly 52, and the positive cooling fin 53.

The nuts 12 are fitted in the tip ends of the three bolts 11 exposed from the sleeves 12A to be tightened securely, which causes the negative cooling fin 51, the terminal block assembly 52, and the positive cooling fin 53 to be fixedly mounted on the outer surface of the end wall 3c of the rear frame 3b. Each of the insulating sleeves 12A works to electrically insulate between a corresponding one pair of bolts 11 and nuts 12 and the positive cooling fin 53.

The terminal block assembly 52 is arranged between the negative cooling fin 51 and the positive cooling fin 53 to provide an electrically insulating space therebetween and is provided with the terminal blocks 52a each fixedly supporting the conductive members for AC wiring for the rectifier 5.

Leads drawn out from the cathodes of the negative diodes 54 and those drawn out from the anodes of the positive diodes 56 of each of the first and second three-phase full-wave rectifier bridges of the rectifier 5 are joined respectively to portions of the conductive members extending from the terminal blocks 52a to establish electrical connection therebetween.

The conductive members of the terminal blocks 52a are electrically connected to the corresponding stator leads 4c extending from the phase output terminals of the three-phase windings of the stator coil 4, respectively. For example, the neutral point of the star-connected three-phase windings is electrically connected to a stator lead 4c for the neutral point, and the stator lead 4c for the neutral point is grounded.

The electrical connection between the negative cooling fin 51 and the rear frame 3b allows the negative cooling fin 51 to be grounded via the rear frame 3b. An output terminal of the alternator 1 is fixedly joined to the positive cooling fin 53 to be electrically coupled thereto.

As illustrated in FIG. 2, the negative cooling fin 51 and the positive cooling fin 53 are configured to radially extend with respect to the axial direction of the rotary shaft 10 such that an outer periphery of the positive cooling fin 53 is smaller in distance with respect to the rotary shaft 10 than an outer periphery 51A of the negative cooling fin 51. In other words, the outer periphery 51A of the negative cooling fin 51 is configured to more radially outwardly extend with respect to the outer periphery of the positive cooling fin 53.

The outer periphery 51A of the negative cooling fin 51 is so formed with a number of, for example, four through holes 511 to 514 therethrough as to be spaced substantially 90 degrees apart with respect to the axial direction of the rotary shaft 10. A number of, for example, four screw bolts 13 are inserted in the respective through holes 511 to 514 to extend therefrom. The rear frame 3b and the negative cooling fin 51 are fastened together by the screw bolts 13. The regulator 6 is configured to be fastened to the negative cooling fin 51 by screws 6a, but it can be fastened to the end wall 3c of the rear frame 3b.

The rear frame 3b having an improved structure according to the embodiment will be described hereinafter with reference to FIGS. 1 and 3 to 5.

As described above, the rear frame 3b has the circular end wall 3c and the annular side wall 3d extending from the periphery of the inner surface of the circular end wall 3c in parallel to the axial direction of the rotary shaft 10. For example, the circular end wall 3c and the annular side wall 3d are integrally formed by injecting an molten Aluminum under high pressure into a mold (die) having a cavity whose configuration corresponds to the configuration of the circular end wall 3c and the annular side wall 3d.

Specifically, the end wall 3c is composed of an annular peripheral portion 31 continuing from the annular side wall 3d, and a tubular boss 32 having a cylindrical side wall constituting the periphery of the hole H thereof in the axial direction of the rotary shaft 10. The bearing B2 is supported by the tubular boss 32 so that the rotary shaft 10 is rotatably supported in the hole H by the bearing B2.

The end wall 3c is composed of a number of, for example, four supporting rods 33a to 33d radially arranged at intervals. Each of the supporting rods 33a to 33d is configured to join the tubular boss 32 to the annular peripheral portion 31. Each of the supporting rods 33a to 33d has outer surface facing the negative cooling fin 51.

Figure 3:
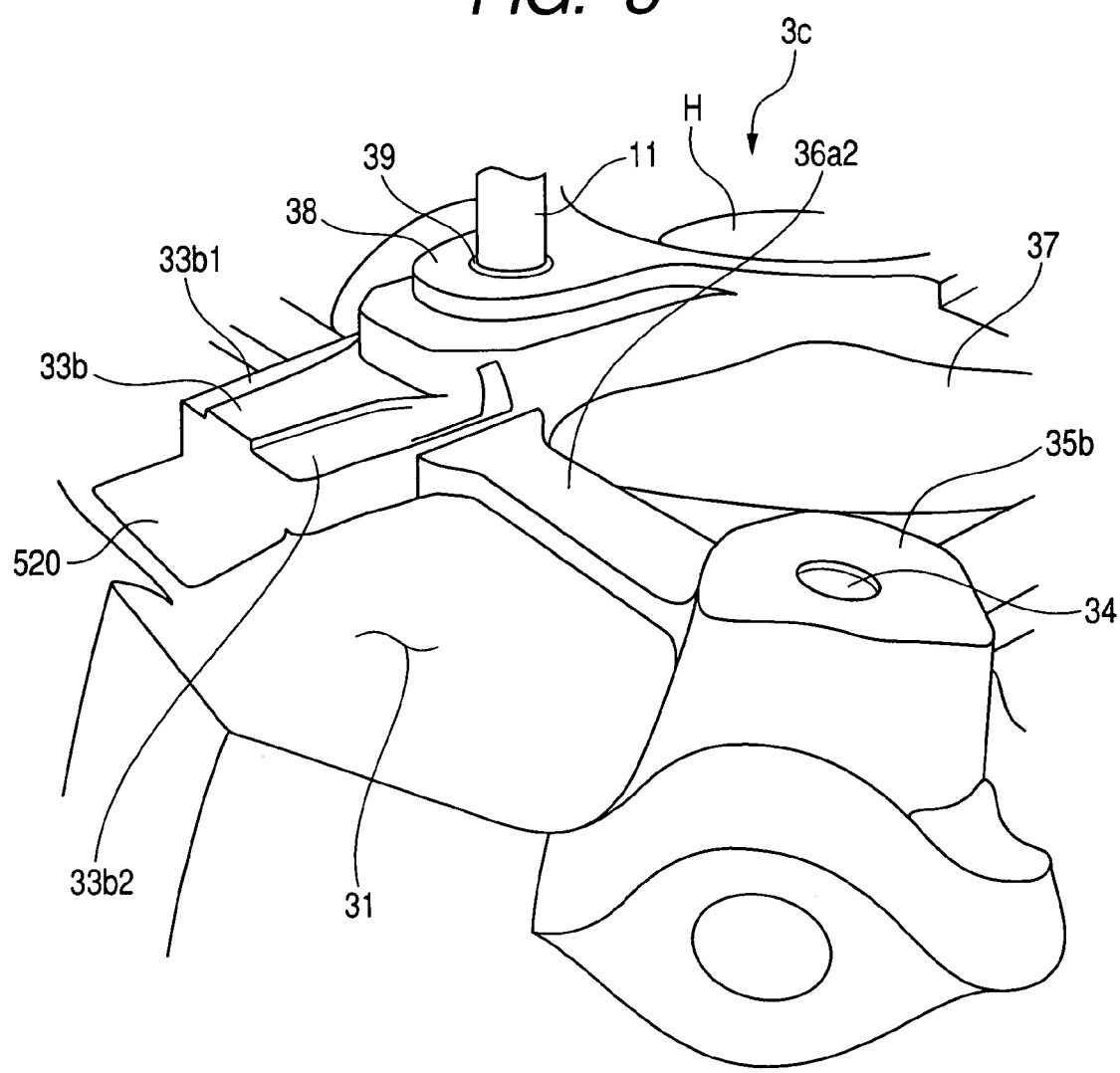
FIG. 3 is an expand perspective view specifically illustrating part of a rear frame of the alternator illustrated in FIG. 1.
Figure 4:
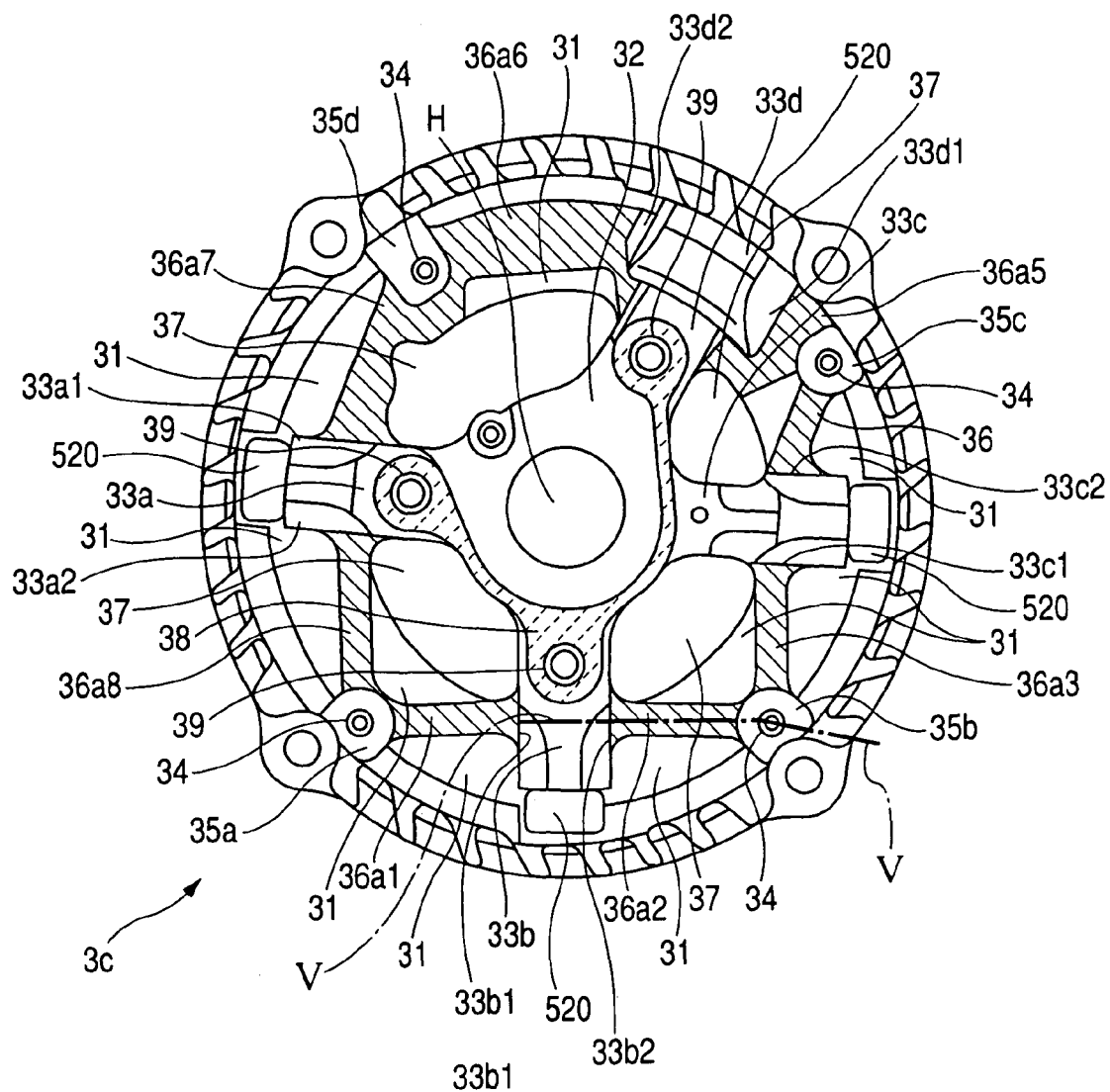
FIG. 4 is a rear side view of the rear frame of the alternator illustrated in FIG. 1.
Figure 5:
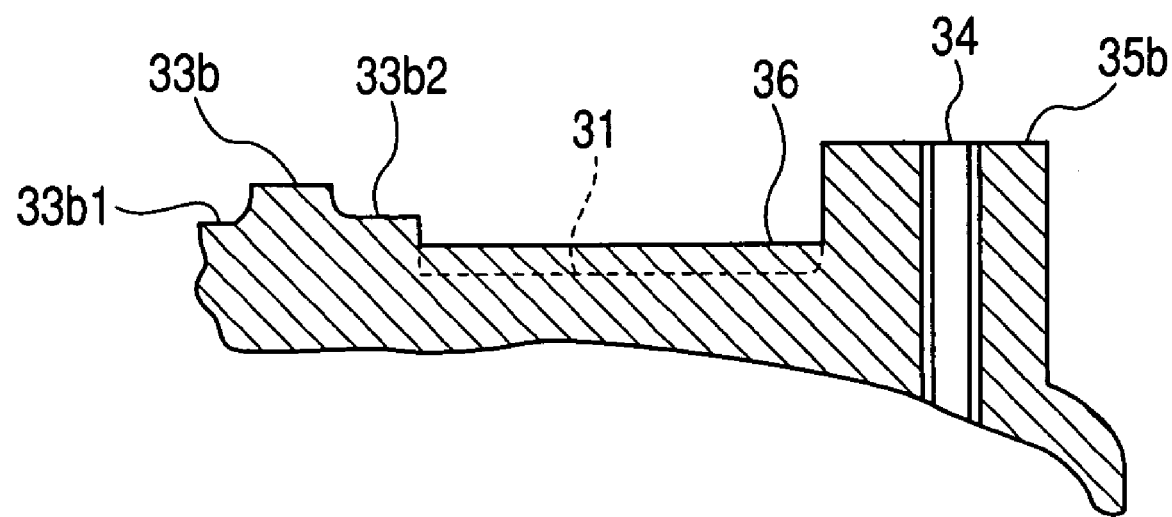
FIG. 5 is a cross sectional view schematically illustrating part of an end wall of the rear frame taken on line V and V of FIG. 4.

As illustrated in FIGS. 3 to 5, the end wall 3c is composed of a number of, for example, four fin supports 35a to 35d. The fin supports 35a to 35d are respectively formed at separated parts of the outer surface of the annular peripheral portion 31 such that the separated parts of the outer surface axially project toward the negative cooling fin 51 (the rear end cover 8) to have predetermined radially and circumferentially extending surfaces, respectively.

The fin supports 35a to 35d are radially arranged to be spaced substantially 90 degrees apart with respect to the axial direction of the rotary shaft 10. In other words, the fin supports 35a to 35d can be substantially regarded to be located on a circle.

Each of the fin supports 35a to 35d is formed with a female screw hole 34 therethrough. The female screw hole 34 formed through each of the fin supports 35a to 35d aligns with a corresponding one of the through holes 511 to 514. For example, the supporting rods 33a to 33d, the fin supports 35a to 35d, and the female screw holes 34 are arranged such that each of the fin supports 35a to 35d (female screw holes 34) is located at substantially equal distances from corresponding one pair of supporting rods circumferentially adjacent to each other.

The end wall 3c is composed of a reinforcing ridge 36. The reinforcing ridge 36 is formed such that particular regions of the outer surface of the end wall 3c axially project toward the negative cooling fin 51 (the rear end cover 8). The reinforcing ridge 36 will be described hereinafter in detail.

The end wall 3c is composed of the four intake windows 37. Each of the intake windows 37 is formed among a corresponding one supporting rod, another one supporting rod circumferentially adjacent thereto, and the annular peripheral portion 31 disposed therebetween.

The end wall 3c is composed of a fin-seatable portion 38 formed at particular locations of the outer surfaces of the supporting rods 33a to 33d such that the particular locations of the outer surfaces are integrally elevated axially toward the negative cooling fin 51 to have a predetermined radially and circumferentially extending surface partly surrounding the tubular boss 32.

Each of the three fitting holes 39 is formed through a corresponding part of the fin-seatable portion 38 and a corresponding one of the supporting rods 33a to 33d in the axial direction of the end wall 3c. A part of the fin-seatable portion 38 surrounding a corresponding one of the fitting holes 39 has a substantially ring shape illustrated by dashed hatching in FIG. 3 for the purpose of easily understanding the structure of the fin-seatable portion 38. The negative cooling fin 51 is configured to be seated on the fin-seatable portion 38 and each of the fin supports 35a to 35d when attached to the end wall 3c of the rear frame 3b.

The three supporting rods 33a to 33c are arranged to be spaced substantially 90 degrees apart with respect to the axial direction of the rotary shaft 10. The remaining one supporting rod 33d is arranged to be circumferentially inclined toward the supporting rod 33c such that a space defined between the circumferentially adjacent supporting rods 33a and 33d is greater in size than that defined between the circumferentially adjacent supporting rods 33d and 33c. This allows a corresponding one intake window 37 formed between the circumferentially adjacent supporting rods 33a and 33d to be greater in size than another one intake window 37. The configuration of the supporting rods 33a to 33d allow a space to be allocated in order to arrange the regulator 6 and the brush assembly 7.

The end wall 3c is composed of a number of, for example, four through holes 520 formed through the annular peripheral portion 31 and arranged radially outwardly adjacent to the radial outer edges of the supporting rods 33a to 33d, respectively. For example, three of the four through holes 520 arranged radially outwardly adjacent to the radial outer edges of the supporting rods 33a to 33c are located opposing the terminal blocks 52a, respectively. The three of the four through holes 520 allow the stator leads 4c for the respective phase output terminals and for the neutral point to be drawn out therethrough toward the corresponding terminal blocks 52a, respectively.

As set forth above, the fin supports 35a to 35d are respectively formed at separated parts of the outer surface of the annular peripheral portion 31 such that the separated parts of the outer surface are axially protruded toward the rear end cover 8 to have predetermined radially and circumferentially extending surfaces, respectively. This allows the radially and circumferentially extending surfaces of the fin supports 35a to 35d to be in contact on the negative cooling fin 51.

Specifically, the radially and circumferentially extending surface of each of the fin supports 35a to 35d is configured to abut on an annular portion surrounding a corresponding one of the through holes 511 to 514 formed on an outer peripheral ring portion 51A of the negative cooling fin 51.

In this abutting state, the screw bolts 13 are inserted in the respective through holes 511 to 514 to be penetrated therefrom. The penetrated portions of the screw bolts 13 are engaged with the corresponding female screw holes 34 of the fin supports 35a to 35d, respectively. This allows the outer peripheral ring portion 51A of the negative cooling fin 51 to be fixedly mounted on the rear frame 3b by the screw bolts 13.

Next, the structure of the reinforcing ridge 36 and that of each of the supporting rods 33a to 33d will be described hereinafter with reference to FIGS. 3 to 5.

The reinforcing ridge 36 according to the embodiment is formed such that the particular regions of the outer surface of the annular peripheral portion 31 are raised toward the rear end cover 8.

In other words, the annular peripheral portion 31 is axially thicker at the reinforcing rib portion 36 (each of the particular locations) than at the remaining portion. The reinforcing ridge 36 is illustrated by solid hatching in FIG. 4.

Specifically, the reinforcing ridge 36 consists of a plurality of first to eighth reinforcing ribs 36a1 to 36a8.

The first reinforcing rib 36a1 is so located between the fin support 35a and the supporting rod 33b as to planarly extend therebetween to thereby join them. The second reinforcing rib 36a2 is so located between the supporting rod 33b and the fin support 35b as to linearly extend therebetween to thereby join them.

In other words, the pair of reinforcing ribs 36a1 and 36a2 can be considered as a single rib member that links the circumferentially adjacent fin supports 35a and 35b through the supporting rod 33b.

At least part of one of circumferentially extending side portions of the supporting rod 33b, to which the reinforcing rib 36a1 is joined, has an axial width thicker than that of the reinforcing rib 36a1 to provide a reinforcing ridge 33b1.

Similarly, at least part of the other of the circumferentially extending side portions of the supporting rod 33b, to which the reinforcing rib 36a2 is joined, has an axial width thicker than that of the reinforcing rib 36a2 to provide a reinforcing ridge 33b2.

The third reinforcing rib 36a3 is so located between the fin support 35b and the supporting rod 33c as to planarly extend therebetween to thereby join them. The fourth reinforcing rib 36a4 is so located between the supporting rod 33c and the fin support 35c as to linearly extend therebetween to thereby join them.

The pair of reinforcing ribs 36a3 and 36a4 can be considered as a single rib member that links the circumferentially adjacent fin supports 35b and 35c through the supporting rod 33c.

At least part of one of circumferentially extending side portions of the supporting rod 33c, to which the reinforcing rib 36a3 is joined, has an axial width thicker than that of the reinforcing rib 36a3 to provide a reinforcing ridge 33c1.

Similarly, at least part of the other of the circumferentially extending side portions of the supporting rod 33c, to which the reinforcing rib 36a4 is joined, has an axial width thicker than that of the reinforcing rib 36a4 to provide a reinforcing ridge 33c2.

The fifth reinforcing rib 36a5 is so located between the fin support 35c and the supporting rod 33d as to planarly extend therebetween to thereby join them. The sixth reinforcing rib 36a6 is so located between the supporting rod 33d and the fin support 35d as to planarly extend therebetween to thereby join them.

The pair of reinforcing ribs 36a5 and 36a6 can be considered as a single rib member that links the circumferentially adjacent fin supports 35c and 35d through the supporting rod 33d.

At least part of one of circumferentially extending side portions of the supporting rod 33d, to which the reinforcing rib 36a5 is joined, has an axial width thicker than that of the reinforcing rib 36a5 to provide a reinforcing ridge 33d1.

Similarly, at least part of the other of the circumferentially extending side portions of the supporting rod 33d, to which the reinforcing rib 36a6 is joined, has an axial width thicker than that of the reinforcing rib 36a6 to provide a reinforcing ridge 33d2.

The seventh reinforcing rib 36a7 is so located between the fin support 35d and the supporting rod 33a as to planarly extend therebetween to thereby join them. The eighth reinforcing rib 36a8 is so located between the supporting rod 33a and the fin support 35a as to planarly extend therebetween to thereby join them.

The pair of reinforcing ribs 36a7 and 36a8 can be considered as a single rib member that links the circumferentially adjacent fin supports 35d and 35a through the supporting rod 33a.

At least part of one of circumferentially extending side portions of the supporting rod 33a, to which the reinforcing rib 36a7 is joined, has an axial width thicker than that of the reinforcing rib 36a7 to provide a reinforcing ridge 33a1.

Similarly, at least part of the other of the circumferentially extending side portions of the supporting rod 333, to which the reinforcing rib 36a8 is joined, has an axial width thicker than that of the reinforcing rib 36a8 to provide a reinforcing ridge 33a2.

As described above, because the fin supports 35a to 35d can be substantially regarded to be located on a circle, the single rib member of the pair of reinforcing ribs 36a1 and 36a2 substantially corresponds to a chord passing through the fin supports 35a and 35b. This means an angle formed by each of the reinforcing ribs 36a1 and 36a2 and the chord passing through the fin supports 35a and 35b can be limited within an angle of 10 degrees or less.

Similarly, the single rib member of the pair of reinforcing ribs 36a3 and 36a4 substantially corresponds to a chord passing through the fin supports 35b and 35c. This means an angle formed by each of the reinforcing ribs 36a3 and 36a4 and the chord passing through the fin supports 35b and 35c can be limited within an angle of 10 degrees or less.

Moreover, the single rib member of the pair of reinforcing ribs 36a7 and 36a8 substantially corresponds to a chord passing through the fin supports 35d and 35a. This means an angle formed by each of the reinforcing ribs 36a7 and 36a8 and the chord passing through the fin supports 35d and 35a can be limited within an angle of 10 degrees or less.

The reinforcing ribs 36a1 and 36a2 are arranged substantially orthogonal to the supporting rod 33b and symmetrical to each other with respect thereto, which allows the reinforcing ribs 36a1 and 36a2 to be substantially equal to each other in length.

Similarly, the reinforcing ribs 36a3 and 36a4 are arranged substantially orthogonal to the supporting rod 33c and symmetrical to each other with respect thereto, which allows the reinforcing ribs 36a3 and 36a4 to be substantially equal to each other in length. In addition, the reinforcing ribs 36a7 and 36a8 are arranged substantially orthogonal to the supporting rod 33a and symmetrical to each other with respect thereto, which allows the reinforcing ribs 36a7 and 36a8 to be substantially equal to each other in length.

Preferably, in the embodiment, the description that the length of one of the reinforcing ribs is substantially equal to that of another one thereof means that the difference in length between one of the reinforcing ribs and another one thereof is lied within 20 percent of the longer one.

Figure 6:
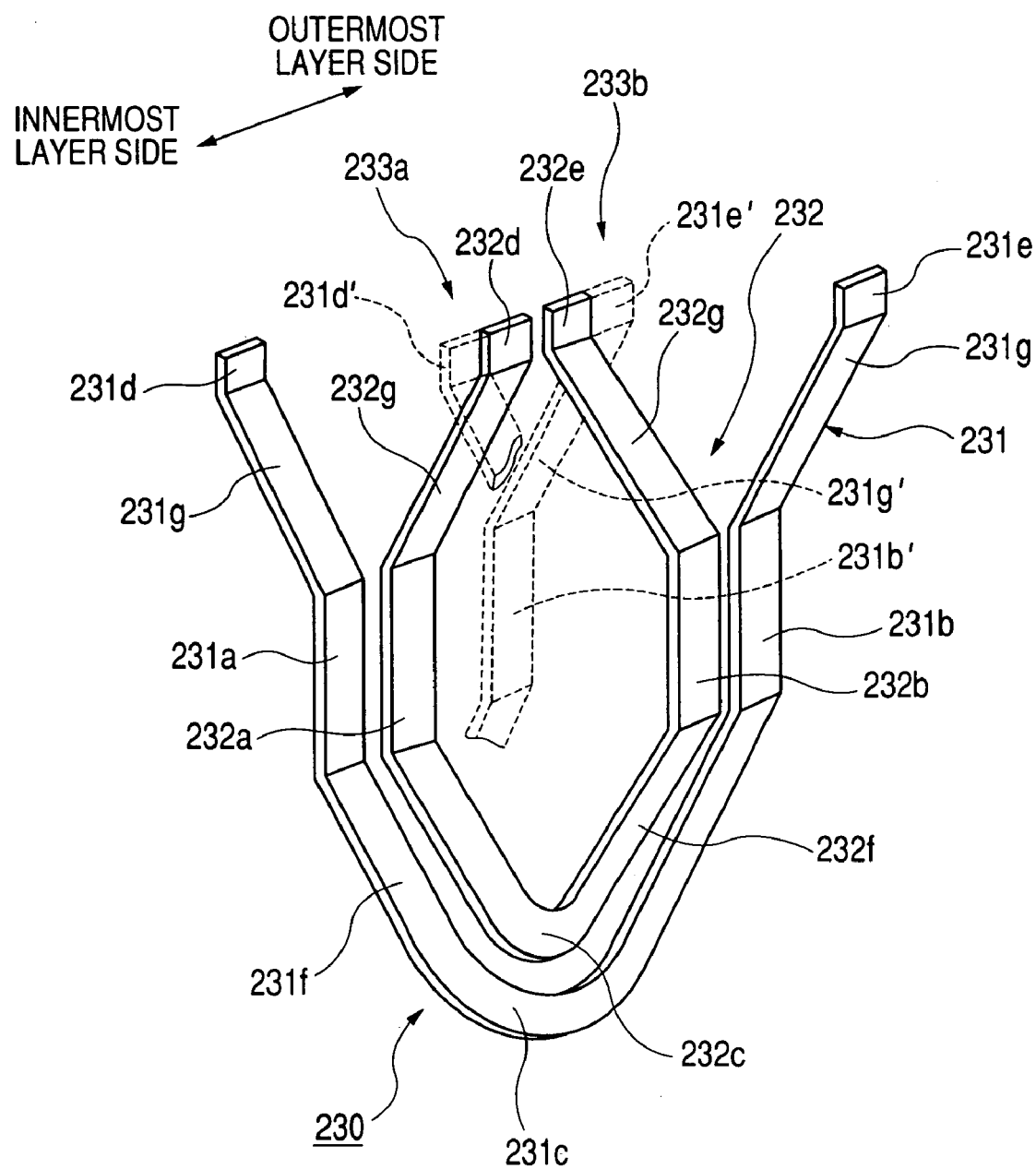
FIG. 6 is an enlarged perspective view of a conductor segment unit consisting of large and small conductor segments constituting each of three-phase windings of a stator coil installed in a stator of the alternator illustrated in FIG. 1.

In the embodiment, as illustrated in FIG. 6, each of the three-phase windings of the stator coil 4b is for example made up of a plurality of conductor segment units 230 each serving as a basic conductor segment unit.

Each of the conductor segment units (basis segment units) 230 consists of a pair of a large conductor segment 231 and a small conductor segment 232 each with a substantially rectangular shape in its lateral cross section.

The large conductor segment 231 is composed of a pair of straight portions 231a and 231b, and a U- or V-shaped turn portion 231c. The paired straight portions 231a and 231b having their one ends and continuously extending from ends of the turn portion 231c are to be inserted into corresponding slots of the stator core 4a.

The large conductor segment 231 is also composed of inclined portions (legs) 231g continuing from the other ends of the straight portions 231a and 231b.

The inclined portions 231g project outside the corresponding slots when the straight portions 231a and 231b are placed within the corresponding slots so as to be outwardly bent with a predetermined electric angle with respect to the axial direction of the corresponding slots.

The inclined portions 231g have respective tip ends 231d and 231e to be welded. The tip ends 231d and 231e are bent from the respective projective ends of the inclined portions 231g to extend in the axial direction of the stator core 4a.

The turn portion 231c of the large conductor segment 231 is composed of a tip portion and a pair of slant portions 231f. The paired slant portions 231f are designed to continue from both ends of the tip portion, slant with a predetermined electric angle with respect to the axial direction of the corresponding slots, and lead to the straight portions 231a and 231b, respectively.

Similarly, the small conductor segment 232 is composed of a pair of straight portions 232a and 232b, and a U- or V-shaped turn portion 232c. The paired straight portions 232a and 232b having their one ends and continuously extending from ends of the turn portion 232c are to be inserted into corresponding slots of the stator core 4a.

The small conductor segment 232 is also composed of inclined portions (legs) 232g continuing from the other ends of the straight portions 232a and 232b.

The inclined portions 232g project outside the corresponding slots when the straight portions 232a and 232b are placed within the corresponding slots so as to be inwardly bent with a predetermined electric angle with respect to the axial direction of the corresponding slots.

The inclined portions 232g have respective tip ends 232d and 232e to be welded. The tip ends 232d and 232e are outwardly bent from the respective projective ends of the inclined portions 232g to extend in the axial direction of the stator core 4a.

The turn portion 232c of the small conductor segment 232 is composed of a tip portion and a pair of slant portions 232f. The paired slant portions 232f are designed to continue from both ends of the tip portion, slant with a predetermined electric angle with respect to the axial direction of the corresponding slots, and lead to the straight portions 232a and 232b, respectively.

Figure 7:
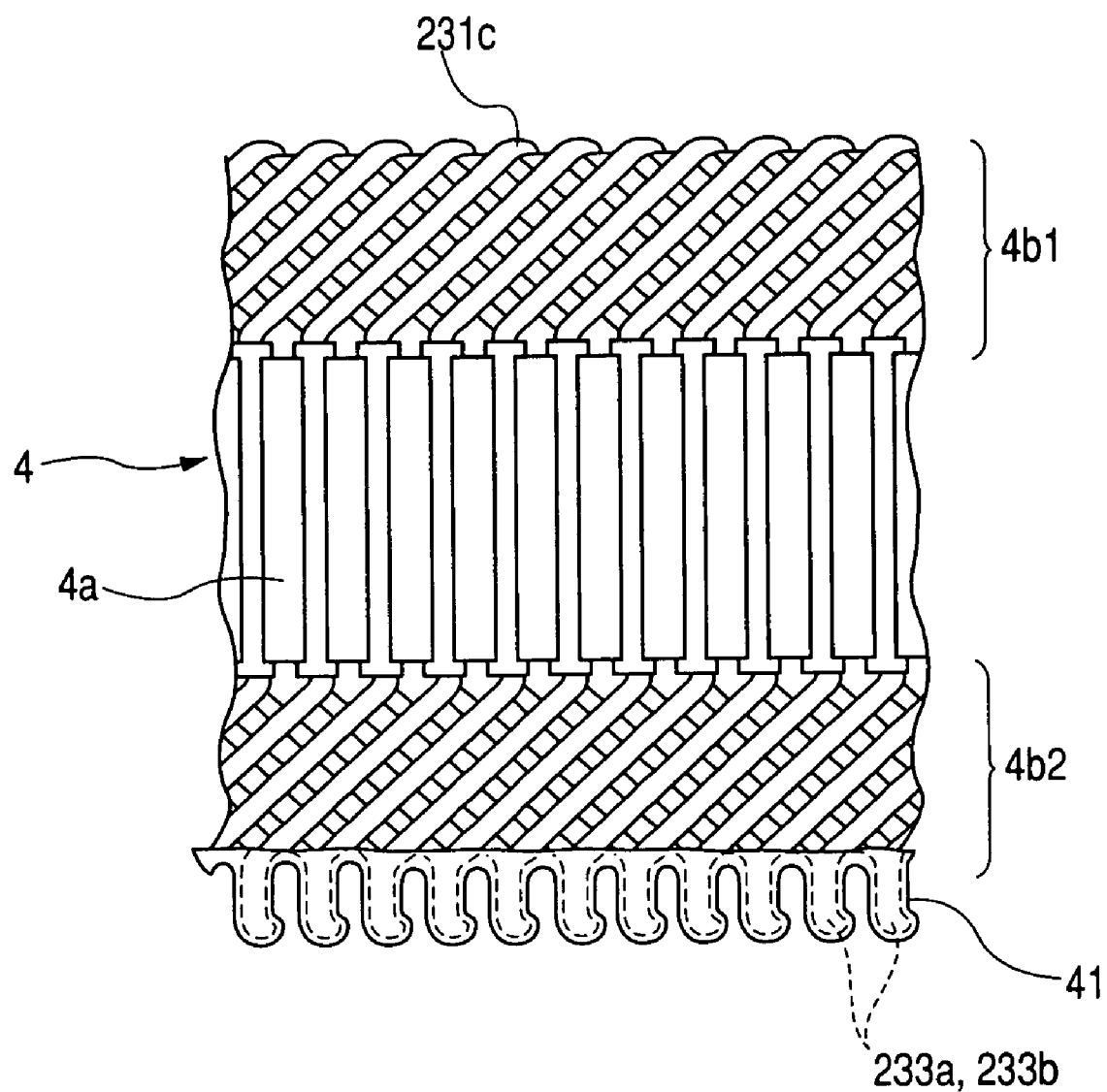
FIG. 7 is an enlarged view schematically illustrating the stator as viewed from an inner side thereof.

As illustrated in FIG. 7, the turn portions 231c and 232c projecting from the corresponding slots of the stator core 4a through the second axial end surface side (rear side) thereof provide the first coil end portion 4b1.

The inclined portions 231g and 232g projecting from the corresponding slots of the stator core 4a through the first axial end surface side (front side) thereof provide the second coil end portion 4b2.

In the embodiment, the large conductor segment 231 is covered with an insulating film except for its corresponding ends 231d and 231h by, for example, baking. Similarly, the small conductor segment 232 is covered with an insulating film except for its corresponding ends 232d and 232h, by, for example, baking.

In the embodiment, an even number, such as four, of the straight portions are inserted in each slot of the stator core 4a. Four straight portions being disposed in one of the slots of the stator core 4a are aligned in the radial direction and respectively disposed in an innermost layer, an inner middle layer, an outer middle layer, and an outermost layer from the inner periphery of each slot (see FIG. 6).

Figure 8:
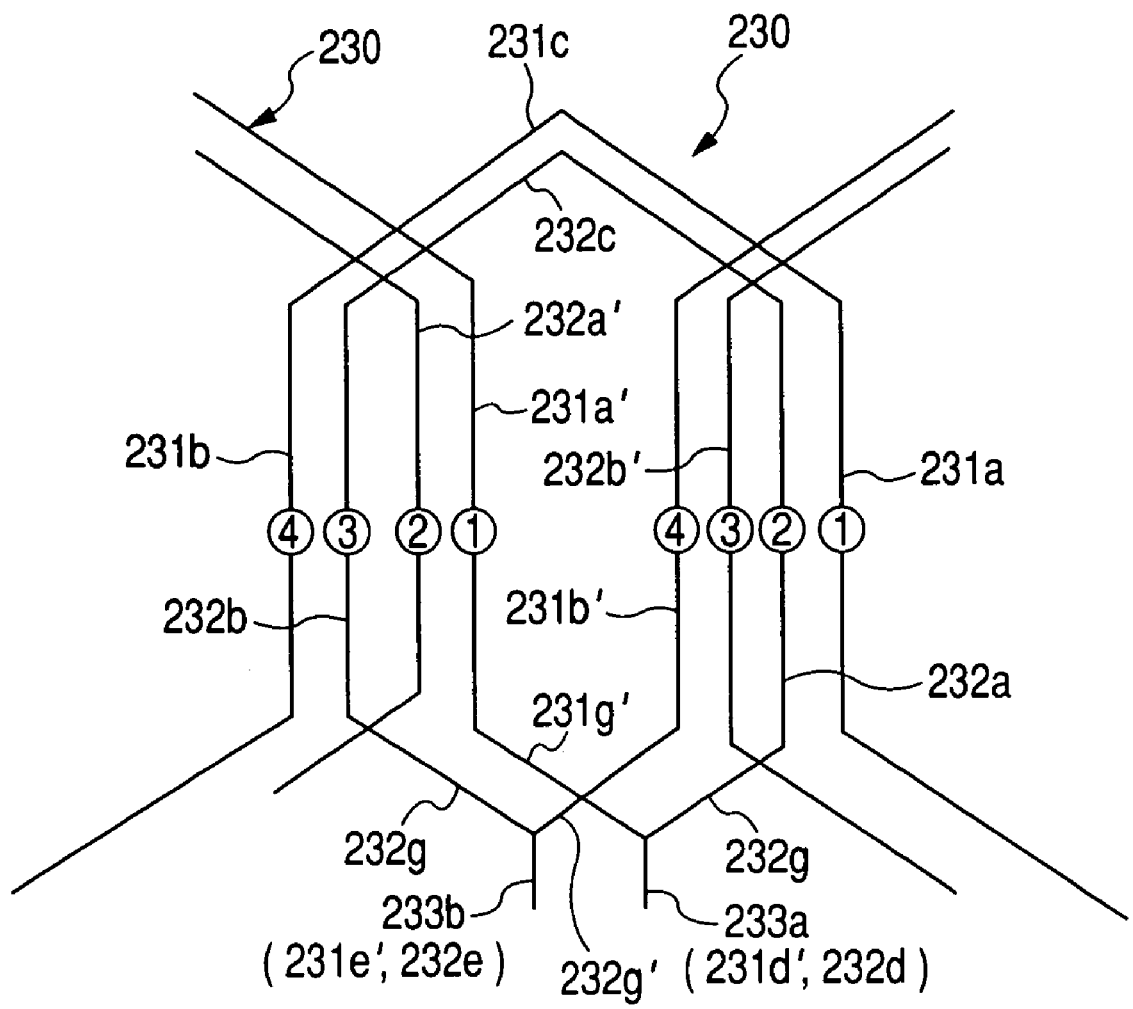
FIG. 8 is an enlarged winding diagram development of part of the stator coil according to the embodiment.

For example, as illustrated in FIG. 8, a straight portion 231a (①) disposed in the innermost layer of one of the slots is paired with a straight portion 231b (④) disposed in the outermost layer of another slot that is circumferentially spaced apart from the one of the slots by one pole pitch (six slot pitches) in, for example, clockwise direction.

Similarly, a straight portion 232a (②) disposed in the inner middle layer of one of the slots is paired with a conductor member 232b (③) disposed in the outer middle layer of another slot that is circumferentially spaced apart from the one of the slots by one pole pitch in clockwise direction.

The paired conductor members 231a and 232b are connected to each other by a corresponding turn portion 231c at the second axial end surface side (rear side) of the stator core 4a.

The paired straight portions 232a and 232b are also connected to each other by a corresponding turn portion 232c at the second axial end surface side (rear side) of the core 4a.

The straight portion 232a arranged in the inner middle layer of one of the slots is paired with a straight portion 231a' arranged in the innermost layer of another slot that is one pole pitch clockwise spaced apart from the one of the slots.

Similarly, the straight portion 231b' arranged in the outermost layer of one of the slots is also paired with a straight portion 232b arranged in the outer middle layer of another slot that is one pole pitch clockwise spaced apart from the one of the slots. Junctions between the paired conductor members are disposed at the first axial end surface side (front side) of the stator core 4a.

As illustrated in FIGS. 6 and 8, each reference number with no dash and that with a dash (') are assigned to the identical portions of different conductor segment units 230 (conductor segments 231 and 232).

In the stator 3 according to the embodiment, the tip end 232e and the tip end 231e' are arranged to be adjacently contacted to each other in a radial direction of the stator core 4a.

Similarly, the tip end 232d and the tip end 231d' are arranged to be adjacently contacted to each other in a radial direction of the stator core 4a.

In this state, the tip end 232e and the tip end 231e' are joined to each other by, for example, welding, thus providing a joint portion 233b. Similarly, the tip end 232d and the tip end 231d' are joined to each other by, for example, welding, thus providing a joint portion 233a. The joint portion 233b and the joint portion 233a are radially arranged such that the joint portion 233b is located outside of the joint portion 233a.

The tip ends 231d and 231e of all of the large conductor segments 231 and the tip ends 232d and 232e are welded to each other in the same manner described above and illustrated in FIGS. 6 to 8. This makes it possible to provide, for example, two radially-adjacent conductor-joint layers. The two radially-adjacent conductor-joint layers are so arranged on different concentric circles, respectively, as to provide a ring clearance therebetween.

Note that such a stator coil structure has been well known in, for example, U.S. Pat. No. 6,201,332 B1, U.S. Pat. No. 6,249,956 B1, U.S. Pat. No. 6,333,573 B1, U.S. Pat. No. 6,404,091 B1, and U.S. Pat. No. 6,885,123 B2. Because all of the U.S. patents are assigned to the same assignee as that of this application, disclosures of these patents are incorporated herein by reference.

In the embodiment, as illustrated in FIG. 7, the second coil end portion 4b2 composed of the joint portions 233a and 233b of the conductor segments 231 and 232 is preferably formed and covered with an insulating resin 41. The insulating resin 41 prevents a short-circuit between circumferentially adjacent joint portions 233a and between circumferentially adjacent joint portions 233b.

In contrast, the first coil end portion 4b1 composed of the turn portions 231c and 232c is uncovered with an additional insulating resin. This enables the effect of cooling the first coil end portion 4b1 of the stator coil 4b by the cooling air to be improved.

As described above, in the rear frame 3b of the alternator 1 according to the embodiment, the reinforcing ridge 36 is formed such that the particular regions of the outer surface of the end wall 3c axially project toward the negative cooling fin 51.

In other words, the annular peripheral portion 31 of the end wall 3c is axially thicker at locally particular regions than at the remaining portion. This enables the rigidity in the portions of the end wall 3c between the respective fin supports 35a to 35d to increase.

The increase in rigidity of the portions of the end wall 3c between the respective fin supports 35a to 35d can reduce the elastic deformation of the rear frame 3b even if radial vibration is transferred to the negative cooling fin 51 via the fin supports 35a to 35d. This enables distance fluctuations between the respective fin supports 35a to 35e to be reduced, thus avoiding distortion of the negative cooling fin 51 even if radial vibration is transferred to the negative cooling fin 51 via the fin supports 35a to 35d. This makes it possible to prevent adverse stress from occurring in each of the negative diodes 54 mounted on the negative cooling fin 51 to thereby reliably keep the operation stability of the rectifier 5 even if radial vibration is transferred to the negative cooling fin 51.

Especially, in the embodiment, the reinforcing ridge 36 consists of a plurality of first to eighth reinforcing ribs 36a1 to 36a8.

As described above, a pair of reinforcing ribs of one pair symmetrically arranged with respect to a corresponding one of the supporting rods 33a to 33c is configured to substantially linearly extend between corresponding circumferentially adjacent fin supports arranged at both sides of the corresponding one of the supporting rods so as to link them.

This configuration allows reduction in the weight of the paired reinforcing ribs and in the amount of material used to produce the paired reinforcing ribs as much as possible while reliably keeping the operation stability of the rectifier 5 even if radial vibration is transferred to the negative cooling fin 51.

Similarly, one paired reinforcing ribs symmetrically arranged with respect to a corresponding one of the supporting rods 33a to 33c are arranged to be orthogonal to the corresponding one of the supporting rods 33a to 33c.

This configuration allows reduction in the weight of the paired reinforcing ribs and in the amount of material used to produce the paired reinforcing ribs as much as possible while reliably keeping the operation stability of the rectifier 5 even if radial vibration is transferred to the negative cooling fin 51.

In addition, one paired reinforcing ribs symmetrically arranged with respect to a corresponding one of the supporting rods 33a to 33c are substantially equal to each other in length.

This configuration allows reduction in the weight of the paired reinforcing ribs and in the amount of material used to produce the paired reinforcing ribs as much as possible while reliably keeping the operation stability of the rectifier 5 even if radial vibration is transferred to the negative cooling fin 51.

Because distance fluctuations between the respective fin supports 35a to 35e are reduced, it is possible to prevent vibrating stress, such as rapture stress, from being generated in the joint portions between each of the leads drawn out from the negative diodes 54 and a corresponding one of the AC terminals of the terminal block assembly 52.

In the embodiment, one pair of reinforcing ribs symmetrically arranged with respect to a corresponding one of the supporting rods 33a to 33d is configured to extend between corresponding circumferentially adjacent fin supports arranged at both sides of the corresponding one of the supporting rods so as to link them.

The configuration allows heat transferred from the negative cooling fin 51 to the fin supports 35a to 35d to be effectively and rapidly transferred to the front frame 3a through the first to eighth reinforcing ribs 36a1 to 36a8. This makes it possible to effectively avoid a sudden rise in temperature of the rectifier 5 and effectively cool the negative cooling fin 51, thereby reducing in temperature the cooling air passing through each of the first and second coil end portions 4b1 and 4b2 of the stator coil 4b.

As set forth above, the stator 4 is arranged in the frame 3 such that the first coil end portion 4b1 composed of the turn portions 231c and 232c and uncovered with an additional insulating resin is close to the negative cooling fin 51 with the rectifier 5. This makes it possible to improve the effect of cooling the first coil end portion 4b1 of the stator coil 4b by the cooling air.

Furthermore, when the rear frame 3b is formed by injecting an molten Aluminum under high pressure into a mold (die) having a cavity whose configuration corresponds to the configuration thereof, the reinforcing ribs 36a1 to 36a8 can effectively avoid molten Aluminum from flowing into the portions of the cavity corresponding to the fin supports 35a to 35d. This enable the dimensional accuracy of the fin supports 35a to 35d to increase, thus improving the production yields of the alternator 1 and eliminating the need of cutting the fin supports for reducing the stress applied on the negative diodes 54 in assembling the negative cooling fin 51 to the rear frame 3.

In addition, one pair of reinforcing ribs symmetrically arranged with respect to a corresponding one of the supporting rods 33a to 33d is configured to link circumferentially adjacent fin supports arranged at both sides of the corresponding one of the supporting rods.

This allows manufactured variations in the distances between the circumferentially adjacent fin supports to be reduced, thus avoiding distortion of the portions between the circumferentially adjacent fin supports. This can prevent adverse stress from occurring in each of the negative diodes 54 mounted on the negative cooling fin 51 due to the distortion.

Note that, in the embodiment, one pair of reinforcing ribs symmetrically arranged with respect to a corresponding one of the supporting rods 33a to 33c is configured to substantially linearly extend between corresponding circumferentially adjacent fin supports arranged at both sides of the corresponding one of the supporting rods. This means that each of the reinforcing ribs of one pair has a curvature equal to or lower than a curvature of a circular arc connecting between the corresponding circumferentially adjacent fin supports in the circumferential direction of the annular peripheral portion 31.

Preferably, each of the reinforcing ribs of one pair has a curvature such that a maximum distance between the curvature and a chord connecting the corresponding circumferentially adjacent fin supports is equal to or lower than the half of a maximum distance between the outermost peripheral edge of the annular peripheral portion 31 and the corresponding chord.

Figure 9:
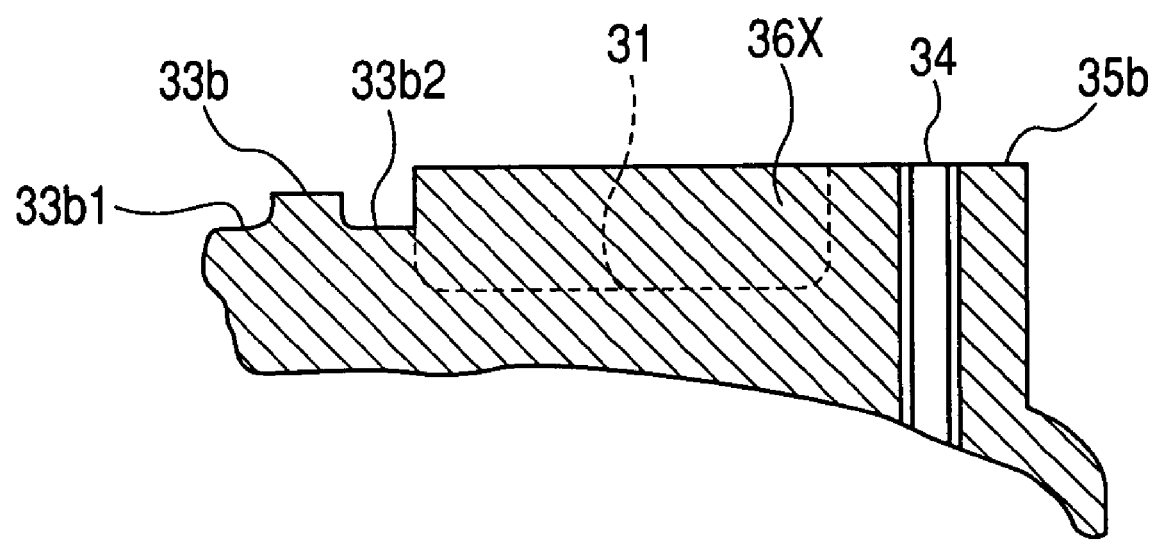
FIG. 9 is a cross sectional view schematically illustrating part of an end wall of a rear frame according to a modification of the embodiment.

As a modification of the embodiment, at least one reinforcing rib 36X can be axially as thick as the corresponding fin supports (see FIG. 9). This allows the negative cooling fin 51 to be seated on the fin-seatable portion 38, each of the fin supports 35a to 35d, and each of the first to eighth reinforcing ribs 36X when attached to the end wall 3c of the rear frame 3b. This makes it possible to more increase the rigidity in the portions of the end wall 3c between the respective fin supports 35a to 35d.

Figure 10:
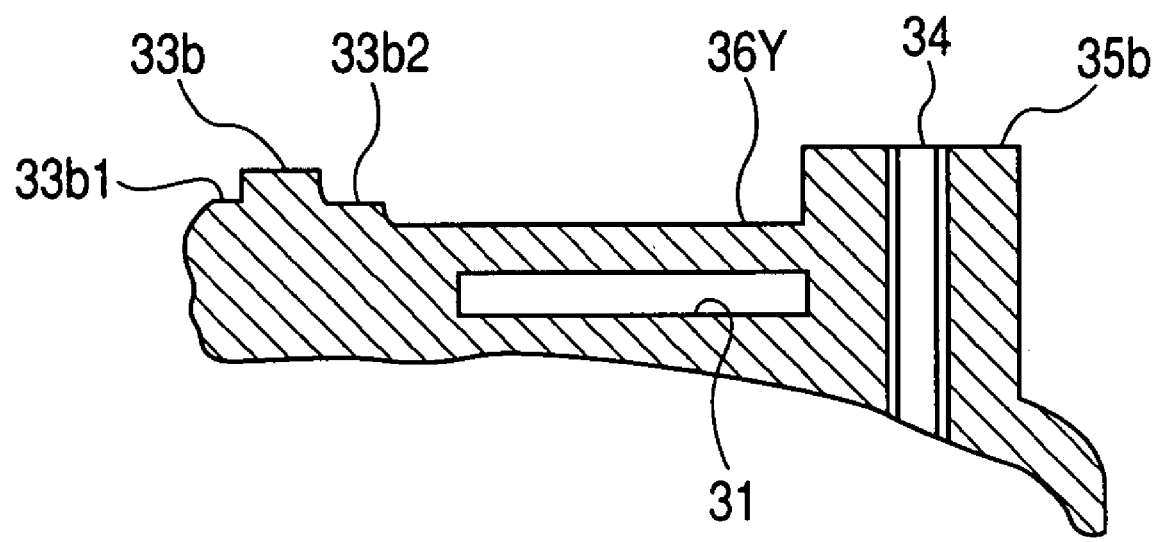
FIG. 10 is a cross sectional view schematically illustrating part of an end wall of a rear frame according to another modification of the embodiment.
Figure 11:
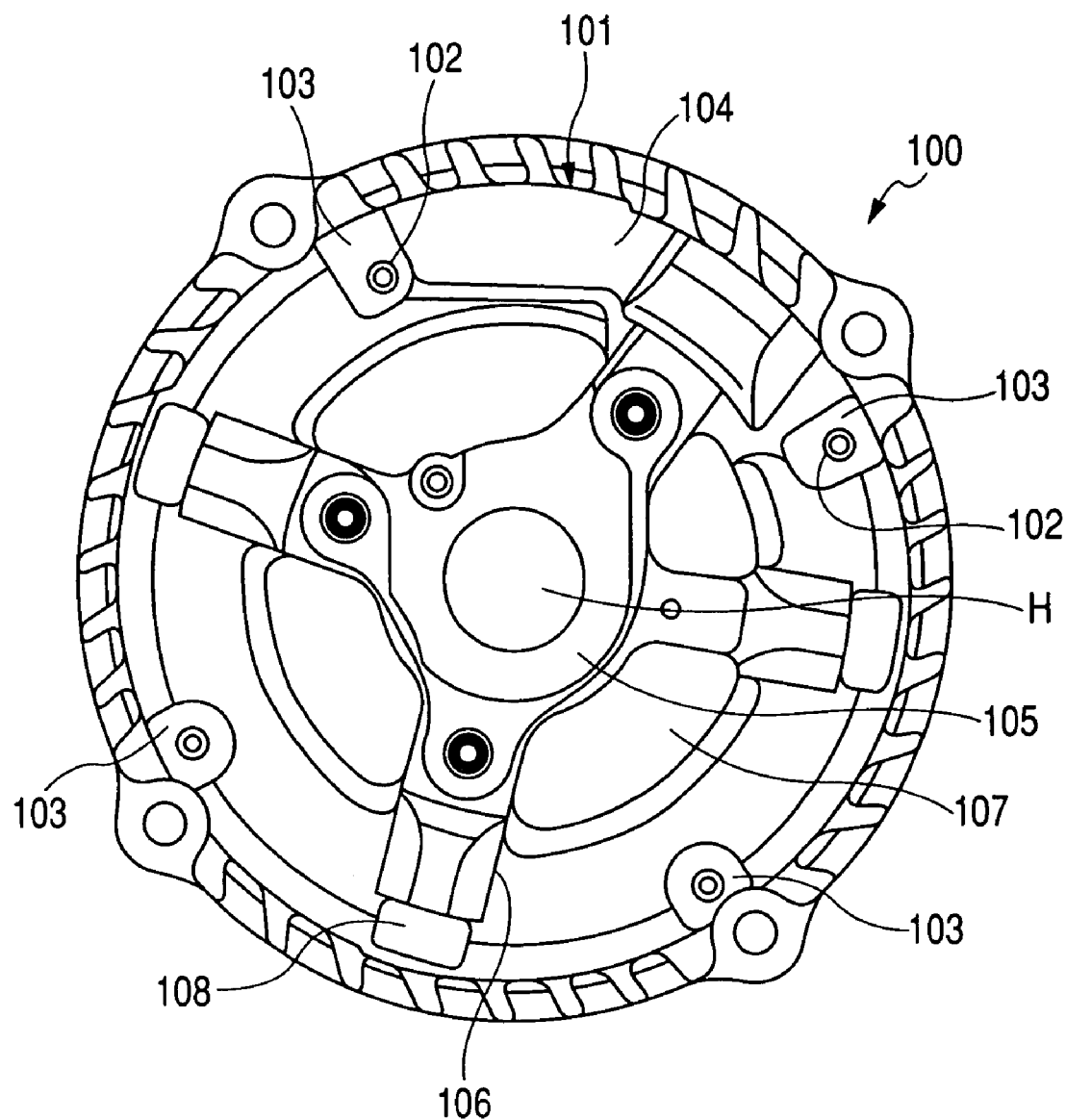
FIG. 11 is a rear side view of a rear frame of a conventional alternator.

As another modification of the embodiment, at least one reinforcing rib 36Y can join between the corresponding fin supports over the outer surface of the annular peripheral portion 31 (see FIG. 10). This makes it possible to reduce in the weight of the at least one reinforcing rib 36Y and in the amount of material used to produce the at least one reinforcing rib as much as possible while reliably keeping the operation stability of the rectifier 5.

In the embodiment, each of the three-phase windings of the stator coil 4b is made up of sequentially joined conductor segments, but the present invention is not limited to the structure.

Specifically, each of the three-phase windings can be made up of a continuous winding wound around the slots of the stator core 4a to provide a radial double-layered annular winding.

In the embodiment, it is possible to freely set the number of turns of respective three-phase windings of the stator coil 4b.

In the embodiment, the present invention is applied to an alternator for vehicles, but the present invention is not limited to the application. Specifically, the present invention can be applied to other types of AC generators installable in other devices.

While there has been described what is at present considered to be the embodiment and its modification of the present invention, it will be understood that various modifications which are not described yet may be made therein, and it is intended to cover in the appended claims all such modifications as fall within the true spirit and scope of the invention.

What is claimed is:

1. An alternating-current generator for rotating, about an axis, a magnetized rotor relative to a stator to generate alternating-current power, the alternating-current generator comprising:
 a rectifier comprising:
  at least one rectifying element working to rectify the generated alternating-current power to direct-current power; and
  a cooling fin on which the at least one rectifying element is mounted; and a frame having an end wall and surrounding the stator and the rotor such that the rotor is rotatable about the axis relative to the stator, the end wall having an inner surface and an outer surface opposing thereto, the inner surface of the end wall facing the rotor and the stator, the end wall being provided with:
  a plurality of fin supports separately arranged on the outer surface of the end wall, the cooling fin being mounted on the plurality of fin supports; and
  a plurality of reinforcements each arranged between a corresponding one of the plurality of fin supports and another one of the plurality of fin supports and each configured to reinforce rigidity of a portion of the end wall, the corresponding one of the plurality of fin supports and the another one of the plurality of fin supports being adjacent to each other in a circumferential direction of the axis of the rotor, the rigidity-reinforced portion of the end wall being located between the corresponding one of the plurality of fin supports and the another one of the plurality of fin supports,
wherein the end wall is further provided with:
an annular peripheral portion surrounding the axis of the rotor, the plurality of fin supports being formed on the external surface of the annular peripheral portion, the plurality of reinforcements being formed on the external surface of the annular peripheral portion;
a boss arranged to be spaced apart from the annular peripheral wall and configured to support the axis of the rotor; and
a plurality of boss supporting members each configured to extend from the boss in a radial direction of the axis of the rotor to join to the annular peripheral portion, the plurality of boss supporting members being spaced from each other in the circumferential direction of the axis of the rotor, and
wherein each of the plurality of reinforcements comprises a pair of reinforcing ribs, one of the pair of reinforcing ribs of each of the plurality of reinforcements being located between the corresponding one of the plurality of fin supports and a corresponding one of the plurality of boss supporting members, the other of the pair of reinforcing ribs of each of the plurality of reinforcements being located between the corresponding one of the plurality of boss supporting members and the another one of the plurality of fin supports, the corresponding one of the plurality of fin supports, the corresponding one of the plurality of boss supporting members, and the another one of the plurality of fin supports being adjacent to each other in the circumferential direction of the axis of the rotor so that the corresponding one of the plurality of fin supports and the another one of the plurality of fin supports are joined to each other.

2. An alternating-current generator according to claim 1, wherein each of the plurality of reinforcements is configured to substantially linearly extend between the corresponding one of the plurality of fin supports and the another one of the plurality of fin supports.

3. An alternating-current generator according to claim 2, wherein the plurality of fin supports are arranged to be substantially located on a circle about the axis of the rotor, each of the plurality of reinforcements substantially corresponds to a chord between the corresponding one of the plurality of fin supports and the another one of the plurality of fin supports.

4. An alternating-current generator according to claim 1, wherein each of the plurality of reinforcements is a ridge of the outer surface of the end wall, the ridge of the outer surface of the end wall being thicker than the remaining portion of the outer surface thereof in an axial direction of the axis of the rotor.

5. An alternating-current generator according to claim 1, wherein the cooling fin is made of a metal and is configured to serve as a negative electrode of the rectifier.

6. An alternating-current generator according to claim 1, wherein the stator comprises a stator core and a stator coil installed therein, and the rectifier comprises a lead electrically connected to the at least one rectifying element, further comprising:
  a terminal portion arranged adjacent to the cooling fin and having a conductive member electrically connected to the stator coil, the lead being electrically connected to the conductor member of the terminal portion.

7. An alternating-current generator according to claim 1, wherein the one and the other of the pair of reinforcing ribs of each of the plurality of reinforcements are arranged to be substantially orthogonal to the radially extending direction of the corresponding one of the plurality of boss supporting members.

8. An alternating-current generator according to claim 7, wherein the one and the other of the pair of reinforcing ribs of each of the plurality of reinforcements has a substantially identical length.

9. An alternating-current generator according to claim 8, wherein the plurality of fin supports are four fin supports, and the four fin supports are arranged to be at substantially regular intervals in the circumferential direction of the axis of the rotor.

10. An alternating-current generator according to claim 1, wherein the stator comprises a stator core and a stator coil installed therein, the stator coil comprising a plurality of conductor segments each including a substantially U shaped turn portion and substantially straight portions extending therefrom and having tip end portions, one of the tip end portions of one of the conductor segments being sequentially joined to one of the tip end portions of another one of the conductor segments to form a series-connected winding corresponding to the stator coil, the stator core being installed in the frame such that the substantially U shaped turn portions of the plurality of conductor segments of the stator core are arranged opposing the end wall of the frame.

* * * * *